United States Patent
Hosomizo (10) Patent No.: US 11,775,230 B2
(45) Date of Patent: Oct. 3, 2023

(54) NON-TRANSITORY COMPUTER-READABLE STORAGE MEDIUM, INFORMATION PROCESSING DEVICE, AND PRINTING METHOD FOR CONTROLLING A PRINTER FROM AN INFORMATION PROCESSING DEVICE

(71) Applicant: BROTHER KOGYO KABUSHIKI KAISHA, Nagoya (JP)

(72) Inventor: Yoshito Hosomizo, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/215,094

(22) Filed: Mar. 29, 2021

(65) Prior Publication Data

US 2021/0216254 A1 Jul. 15, 2021

Related U.S. Application Data (63) Continuation of application No. PCT/JP2020/025803, filed on Jul. 1, 2020.

(30) Foreign Application Priority Data

Dec. 12, 2019 (JP) ................................ 2019-224711

(51) Int. Cl.
*G06F 3/12* (2006.01)

(52) U.S. Cl.
CPC .......... *G06F 3/1208* (2013.01); *G06F 3/1234* (2013.01)

(58) Field of Classification Search
CPC .... G06F 3/1205; G06F 3/1208; G06F 3/1297; G06F 3/1254

(Continued)

(56) References Cited

U.S. PATENT DOCUMENTS

| | | | |
|---|---|---|---|
| 2007/0019258 A1 | 1/2007 | Hattori | |
| 2009/0128595 A1* | 5/2009 | Komamiya | B41J 11/0065 347/14 |

(Continued)

FOREIGN PATENT DOCUMENTS

| | | | |
|---|---|---|---|
| JP | 2007-124435 A | 5/2007 | |
| JP | 2012-243089 A | 12/2012 | |

(Continued)

OTHER PUBLICATIONS

International Search Report with translation and Written Opinion with partial translation dated Sep. 24, 2020 issued in PCT application No. PCT/JP2020/025803.

*Primary Examiner* — Jamares Q Washington
(74) *Attorney, Agent, or Firm* — Scully, Scott, Murphy & Presser, PC (57) ABSTRACT

Provided is technology by which an information processing device having an OS standard general-purpose print program installed therein reduces unevenness in print quality due to a printer-specific characteristic. According to an auxiliary program available for printing using a printer connected to a PC, the PC acquires characteristic data indicative of a characteristic specific to the printer from the printer, and stores the acquired characteristic data in a memory. Further, when a print instruction for causing the printer to execute printing of an image is sent to a general-purpose print program installed in advance in an OS, the PC generates corrected print data corrected based on the characteristic data stored in the memory, for an image that is a print target of the print instruction, and outputs the generated corrected print data such that the generated corrected print data is transmitted from the PC to the printer.

15 Claims, 5 Drawing Sheets

(58) Field of Classification Search
USPC .................................. 358/1.15, 1.6, 1.9, 504
See application file for complete search history.

(56) References Cited

U.S. PATENT DOCUMENTS

| | | | | |
|---|---|---|---|---|
| 2009/0252516 | A1* | 10/2009 | Otsuka | G03G 15/553 |
| | | | | 399/56 |
| 2014/0098403 | A1* | 4/2014 | Kishida | G06F 3/1204 |
| | | | | 358/1.15 |
| 2015/0277827 | A1* | 10/2015 | Oonami | G06F 3/1205 |
| | | | | 358/1.15 |
| 2019/0303076 | A1* | 10/2019 | Kato | G06F 3/1286 |

FOREIGN PATENT DOCUMENTS

| | | |
|---|---|---|
| JP | 2015-191645 A | 11/2015 |
| JP | 2018-081416 A | 5/2018 |
| JP | 2019-175330 A | 10/2019 |
| JP | 2020-107241 A | 7/2020 |

\* cited by examiner

NON-TRANSITORY COMPUTER-READABLE STORAGE MEDIUM, INFORMATION PROCESSING DEVICE, AND PRINTING METHOD FOR CONTROLLING A PRINTER FROM AN INFORMATION PROCESSING DEVICE

CROSS-REFERENCE TO RELATED APPLICATIONS

This is a continuation application of International Application No. PCT/JP2020/025803 filed on Jul. 1, 2020 which claims priority from Japanese Patent Application No. 2019-224711 filed on Dec. 12, 2019. The entire contents of the earlier applications are incorporated herein by reference.

TECHNICAL FIELD

A technical field disclosed herein relates to a non-transitory computer readable storage medium that stores a support program for supporting control on a printer, an information processing device, and a printing method.

BACKGROUND

As technology of controlling a printer from an information processing device such as a personal computer, for example, known is a configuration where a printer driver transmits a calibration command to an image forming apparatus and performs image adjustment of print data by using a result of calibration processing executed by the image forming apparatus.

In recent years, technology of controlling a printer by a general-purpose print program standardly installed in an operating system (hereinbelow, referred to as "OS"), without using the above-described printer driver, is put into practical use. In the technology, when the OS detects a printer, the OS associates the printer and the OS standard general-purpose print program, and when a print instruction to the printer is received thereafter, printing by the OS standard general-purpose print program can be performed without using the printer driver.

However, in the printing by the OS standard general-purpose print program, it is not possible to perform printing corresponding to a printer-specific characteristic. Regarding the printer-specific characteristic, it is also considered to support the printer-specific characteristic by performing image processing and the like on the printer-side. However, it is concerned that the cost of the printer increases and a processing speed is lowered. That is, there is a room for improvement.

SUMMARY

The present specification discloses technology by which an information processing device having an OS standard general-purpose print program installed therein reduces unevenness in print quality due to a printer-specific characteristic.

Disclosed here is a non-transitory computer readable storage medium that stores a support program executable by a computer included an information processing device and that is available for printing using a printer connected to the information processing device, the support program causing the computer to execute: acquisition processing of acquiring characteristic data indicative of a printer-specific characteristic from the printer; and storing processing of storing the characteristic data acquired in the acquisition processing in the storage medium included in the information processing device, in which, in a case where a print instruction that causes the printer to execute printing of an image is sent to a general-purpose print program installed in advance in an operating system of the information processing device, the support program causes the computer to further execute: corrected print data generation processing of generating corrected print data by correcting the image that is a print target of the print instruction based on the characteristic data stored in the storage medium; and output processing of outputting the corrected print data generated in the corrected print data generation processing such that the corrected print data is transmitted from the information processing device to the printer as a transmission destination.

According to the support program disclosed herein, the information processing device acquires the printer-specific characteristic data from the printer, and when the print instruction to the general-purpose print program 41 is received, the information processing device generates the corrected print data corrected based on the acquired characteristic data. When the printer executes printing based on the corrected print data, an image in which the printer-specific characteristic is corrected is printed. As a result, even with the print instruction to the general-purpose print program 41, it is possible to suppress unevenness in print quality due to the printer-specific characteristic.

An information processing device in which the program is installed and a control method for implementing the functions of the program are also novel and useful.

According to the technology disclosed herein, it is possible to implement the technology by which the information processing device having the OS standard general-purpose print program installed therein reduces unevenness in print quality due to the printer-specific characteristic.

BRIEF DESCRIPTION OF DRAWINGS

Aspects of the disclosure are illustrated by way of example and not by limitation in the accompanying figures in which like reference characters indicate similar elements.

DETAILED DESCRIPTION

Hereinbelow, a personal computer (hereinbelow, referred to as "PC") that uses a program of a first aspect will be described in detail with reference to the accompanying drawings. The present aspect is to disclose an embodiment in which a program, which is executed in the PC connected to a printer having a printing function, is implemented.

Figure 1:
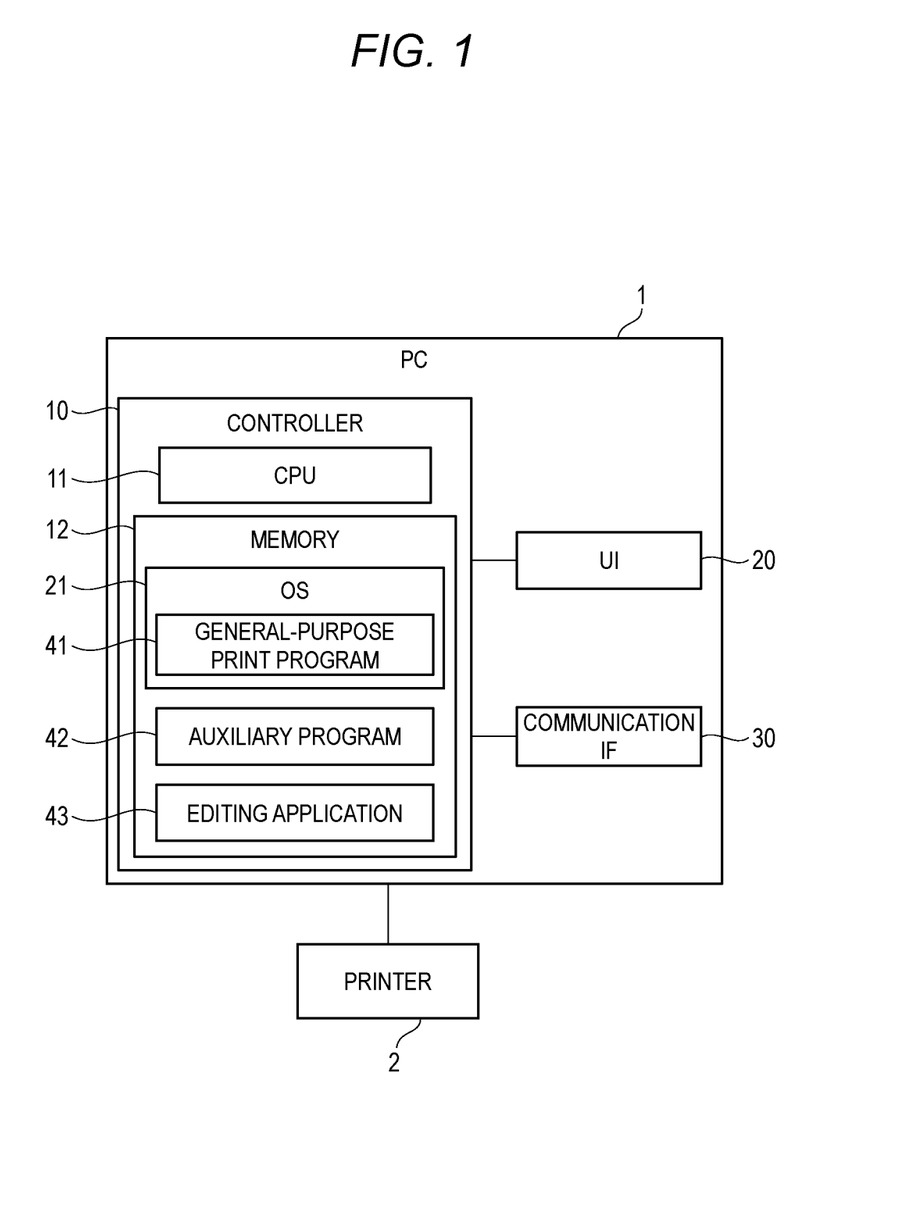
FIG. 1 is a block diagram schematically depicting an electrical configuration of a PC.

As shown in FIG. 1, a PC 1 of the present aspect includes a controller 10, a user interface (hereinbelow referred to as "UI") 20, and a communication interface (hereinbelow referred to as "communication IF") 30. The UI 20 and the communication IF 30 are electrically connected to the controller 10. The PC 1 is an example of the information processing device. The printer 2 is an apparatus having a printing function, and is connected to the PC 1 via local communication or network communication.

The UI 20 includes hardware for performing a variety of displays and receiving a user's instruction input. The UI 20 may be a touch panel having both a display function and an input receiving function or may be a combination of a display having a display function and a keyboard, a mouse and the like each having an input receiving function.

The communication IF 30 includes hardware for performing communication with an external device such as the printer 2 and hardware for accessing the Internet. The communication IF 30 may also include a plurality of interfaces having different communication methods. The communication methods include network communication and USB communication, for example. Also, wired communication and wireless communication are possible.

The controller 10 includes a CPU 11 and a memory 12. The CPU 11 is an example of the computer. The memory 12 includes a ROM, a RAM, and a non-volatile memory, and stores programs such as diverse application programs (hereinbelow, referred to as "application"), a variety of data, and the like. An example of the memory 12 may also be a computer-readable storage medium. The CPU 11 is configured to execute a variety of processing, in accordance with a program read out from the memory 12 and based on a user's instruction. Note that, the controller 10 in FIG. 1 is a collective term for hardware and software that are used for control of the PC 1, and does not necessarily represent single hardware that is actually provided in the PC 1.

An example of the memory 12 may also be a computer-readable storage medium. The computer-readable storage medium is a non-transitory medium. The non-transitory medium includes a recording medium such as a CD-ROM and a DVD-ROM, in addition to the above examples. Also, the non-transitory medium is a tangible medium. Note that, electric signals for conveying a program that is downloaded from a server on the Internet are a computer-readable signal medium that is a type of the computer-readable medium but are not included in the computer-readable non-transitory storage medium.

As shown in FIG. 1, an OS 21 including a general-purpose print program 41, an auxiliary program 42, and an editing application 43 are stored in the memory 12, for example. The auxiliary program 42 is an example of the support program. The editing application 43 is an example of the application program. The OS 21 is, for example, Microsoft Windows (registered trademark), Mac OS (registered trademark), or Linux (registered trademark). Note that a variety of data including information of the connected printer 2, and a variety of programs such as a browser are stored in the memory 12 in addition to the shown ones.

The general-purpose print program 41 is an OS standard program for causing a variety of printers such as the printer 2 to execute printing in response to an instruction from the PC 1. The general-purpose print program 41 of the present aspect is a program including a function of generating print data, which is available for printing by a corresponding printer, based on image data of a print target.

The general-purpose print program 41 is configured to support a function that can be commonly used by a plurality of models of printers provided by vendors of diverse printers. The general-purpose print program 41 supports not all functions that the diverse printers inherently have, and a function that is supported by the general-purpose print program 41 is limited to a general-purpose function.

The auxiliary program 42 is a program or a program group configured to execute processing based on an instruction from the OS 21 in association with processing of the general-purpose print program 41, and is an application configured to support control of target hardware. The auxiliary program 42 of the present aspect supports a model of the printer 2 connected to the PC 1, and is activated from the general-purpose print program 41 when an instruction to cause the printer 2 to execute printing by using the general-purpose print program 41 is received, for example. The auxiliary program 42 is referred to as a hardware support application (abbreviated as HSA), for example.

The auxiliary program 42 is configured to receive a plurality of kinds of commands from the general-purpose print program 41 and to execute a variety of processing, based on the received commands. The auxiliary program 42 can execute different processing, according to contents of execution commands from the general-purpose print program 41. Note that, the auxiliary program 42 may also be a combination of a plurality of programs each of which is configured to receive an execution command, or one program capable of executing different processing, according to commands.

Note that, the auxiliary program may also be a program that is prepared for each type of printers by the vendors of the printers. For example, an auxiliary program for an inkjet printer and an auxiliary program for a laser printer are prepared. The vendor of the printer registers the auxiliary program in a platform that is provided by a vendor of the OS 21, according to a procedure designated by the vendor of the OS 21. When a new printer is connected to the PC 1 and an auxiliary program corresponding to the printer has been registered, the OS 21 downloads the auxiliary program from a server in which the auxiliary program is stored and installs the auxiliary program into the PC 1. Then, the OS 21 stores identification information of the installed auxiliary program in the memory 12, in association with printer information of the newly connected printer. The auxiliary program is not limited to each type of printers, and may also be prepared for each model of printers or each series of printers.

The editing application 43 is, for example, an application for preparing and editing image data and document data, for example. The editing application 43 is, for example, Microsoft Word and PowerPoint. The editing application 43 may also be an application that is provided by the vendor of the printer 2, and the like. The editing application 43 is configured to receive a user operation including an instruction to cause the printer 2 to perform a predetermined operation. Specifically, the editing application 43 is configured to receive a print execution instruction to cause the printer 2 to execute printing via the UI 20, for example.

The printer 2 connected to the PC 1 of the present aspect has specific characteristic data. The characteristic data is a printer-specific value, and is stored in advance in the printer 2. In a case where the printer 2 is an inkjet printer, a head characteristic value may be exemplified as the characteristic data. The head characteristic value is a value based on mechanical positional deviation and ejection unevenness (for example, unevenness in ejection speed and ejection direction) of a plurality of ink ejection ports formed in a head of the printer 2, for example. When there is the mechanical positional deviation or ejection unevenness of the plurality of ink ejection ports, it may affect a print result.

The printer 2 acquires the characteristic data of the printer by inspection before shipment and stores the same in a memory of the printer, for example.

The head characteristic value is a value that does not change after shipment. However, the characteristic data may also be a value that changes due to environmental change or aging deterioration after shipment. For example, in a case where the printer 2 is a laser printer, a gamma correction value, a color deviation correction value, and a color correction value may be exemplified as the characteristic data. The correction values are values for adjusting arrangement of each color and balance of tone when printing a color image, and are values that change due to the environment or over time after shipment.

Also, the printer 2 may have a configuration for executing calibration processing to acquire the characteristic data. Such printer 2 can execute the calibration processing to acquire the latest characteristic data upon the execution. The printer 2 is executes the calibration processing in response to a command received from the PC 1 or the like, and stores the acquired characteristic data in a memory of the printer. The printer 2 may also transmit the acquired characteristic data to the PC 1 or the like that transmits the command. Also, the printer 2 may receive a user's manual input of the characteristic data and store the input characteristic data.

Subsequently, procedures of characteristic data acquisition and printing including operations of the auxiliary program 42 of the present aspect are described with reference to sequence diagrams of FIGS. 2 and 3. Note that, each processing and step of the flowcharts of the embodiments basically indicate processing of the CPU 11 according to commands described in the program such as the auxiliary program 42. The processing that is executed by the CPU 11 includes hardware control using an API of the OS 21. Herein, operations of each program are described while omitting the detailed descriptions of the OS 21. Also, "acquisition" is used as a concept that a request is not essential.

In the present aspect, the auxiliary program 42 acquires the characteristic data stored in the printer 2 via the OS 21. When a condition for acquiring the characteristic data is satisfied, the OS 21 executes a characteristic data acquisition procedure, as shown in FIG. 2.

The OS 21 executes the characteristic data acquisition procedure when the installed auxiliary program 42 is first executed after the auxiliary program 42 is installed in the PC 1. When the OS 21 detects that the auxiliary program 42 is installed in the PC 1, the OS 21 may execute the auxiliary program 42 to execute the characteristic data acquisition procedure. Alternatively, when the auxiliary program 42 is activated by another application or the like (not shown), if the auxiliary program 42 is first executed, the OS 21 may execute the characteristic data acquisition procedure. Also in a case where the auxiliary program 42 is already installed in the PC 1 and a printer of a model, which can be supported by the auxiliary program 42, is newly connected to the PC 1, the OS 21 may execute the characteristic data acquisition procedure with respect to the printer. Also, in a case where a user's instruction to acquire the characteristic data is received via the UI 20, the OS 21 may execute the characteristic data acquisition procedure.

Figure 2:
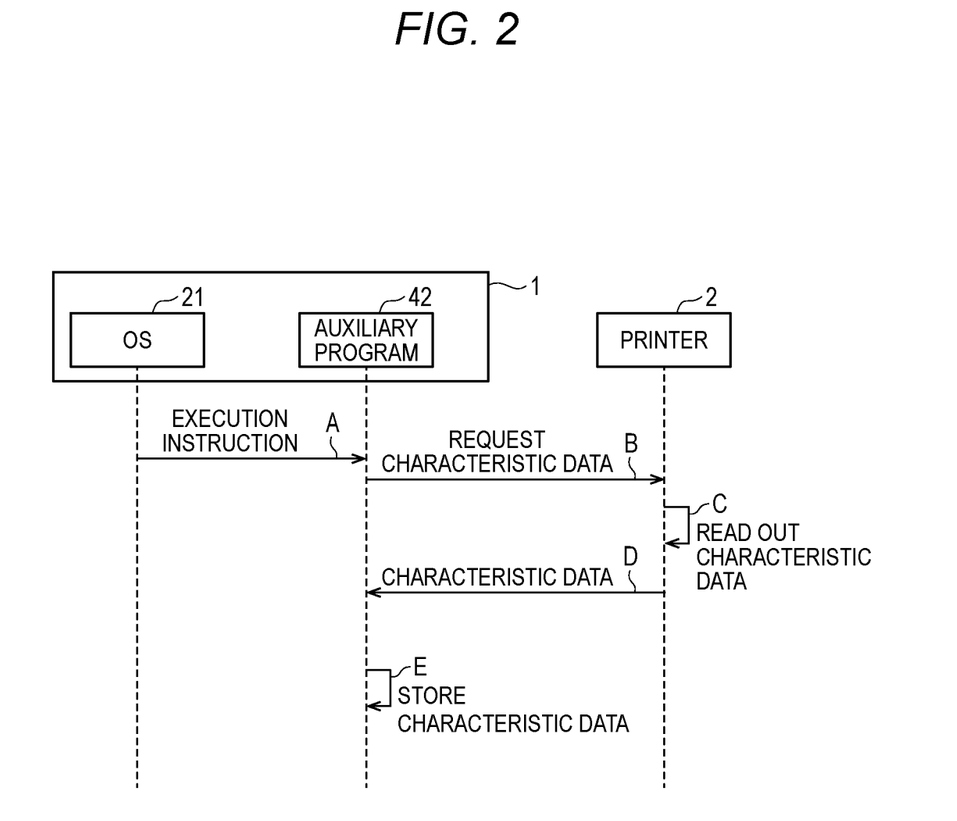
FIG. 2 is a sequence diagram for illustrating an example of a sequence of a characteristic data acquisition operation by each program.

As shown in FIG. 2, the OS 21 transfers an execution instruction to the auxiliary program 42, and operates the auxiliary program 42 (arrow A). When it is determined that it is necessary to acquire the characteristic data, the auxiliary program 42 performs communication with the printer 2 via the communication IF 30, and transmits a signal for requesting the characteristic data stored in the printer 2 (arrow B).

The printer 2 reads out the characteristic data stored in the memory of the printer based on the received signal (arrow C), and sends a reply to the auxiliary program 42 (arrow D). The auxiliary program 42 acquires the characteristic data transmitted from the printer 2 in the processing of the arrow D. The processing of the arrow D is an example of the acquisition processing.

Note that, regarding the communication between the auxiliary program 42 and the printer 2 in the processing of the arrow B, the arrow D and the like, the auxiliary program 42 may perform communication with the printer 2 directly by using MIB (Management Information Base), for example, or via the OS 21. In a case where the communication is performed via the OS 21, the auxiliary program 42 and the printer 2 perform communication complying with communication protocols of the OS 21 such as IPP (Internet Printing Protocol), for example.

Also, the auxiliary program 42 stores the acquired characteristic data in the memory 12 (arrow E). The processing of the arrow E is an example of the storing processing. The auxiliary program 42 stores the acquired characteristic data in a storage area that can be used by the auxiliary program 42, in association with identification information of the printer 2. After storing the characteristic data, the auxiliary program 42 may be once ended.

Upon installation of the auxiliary program 42 or the printer 2, the characteristic data is acquired and stored in the memory 12. When performing the printing operation thereafter, the PC 1 can read out and use the characteristic data from the memory 12. In this case, the number of times to acquire the characteristic data is small and a communication load is also reduced, as compared to a case where the characteristic data is received from the printer 2 each time the printing operation is performed. Note that, the present aspect is particularly favorable when the characteristic data is data that does not depend on the environmental change, for example, data stored in the memory of the printer 2 upon inspection before shipment, such as a mechanical positional deviation amount.

Subsequently, an example of the printing procedure including operations of the auxiliary program 42 of the present aspect is described with reference to a sequence diagram of FIG. 3. FIG. 3 depicts operations that, in a state where the characteristic data is stored in the memory 12 by the processing shown in FIG. 2, are performed in a case where a print execution instruction that causes the printer 2 to execute printing by using the general-purpose print program 41 is received by an application that receives a print instruction such as the editing application 43 and the auxiliary program 42 corresponding to the printer 2 is installed in the PC 1.

In a case where the editing application 43 receives a user's print execution instruction input via the UI 20 in a state where the printer 2 is selected (arrow F), the editing application 43 transfers information indicative of the received print execution instruction to the OS 21. In a case where the OS 21 receives the print execution instruction that uses the general-purpose print program 41, the OS 21 executes the general-purpose print program 41 to transfer the print instruction to the general-purpose print program 41 (arrow G). The general-purpose print program 41 can acquire a variety of information, for example, information indicative of a printer to perform printing, information indicative of the print setting set by the application, and information indicative of image data of a print target by the print instruction.

The general-purpose print program 41 converts a format of the image data included in the received print instruction into a format of intermediate image data to generate intermediate image data, and generates a print job including the intermediate image data (arrow H). The image data included in the editing application 43 has various formats, and the general-purpose print program 41 converts the received image data into intermediate image data suitable for generation of print data. Note that, when the image data included in the print instruction is data suitable for generation of print data, the generation of the intermediate image data may be omitted and the image data may be used as the intermediate image data, as it is. The intermediate image data is, for example, XPS data.

Note that, the general-purpose print program 41 may execute the auxiliary program 42 before the generation of the intermediate image data. The auxiliary program 42 may receive the information indicative of the print setting included in the print instruction from the general-purpose print program 41 and edit a part of the information and return the same to the general-purpose print program 41, for example.

In a case where the apparatus selected in the print instruction is the printer 2, since the auxiliary program 42 that corresponds to the printer 2 is stored in the memory 12, the general-purpose print program 41 outputs an execution command for processing of the auxiliary program 42, operates the auxiliary program 42, and transfers the generated intermediate image data to the auxiliary program 42 (arrow I). Note that, in the processing of the arrow I, the information of the print setting is also transferred to the auxiliary program 42 together with the intermediate image data. The information of the print setting that is transferred to the auxiliary program in the processing of the arrow I may be all information of the print setting received by the general-purpose print program 41 by the print instruction in the processing of the arrow G or may be only information that is not supported by the general-purpose print program 41.

Since the printer selected by the execution command received from the general-purpose print program 41 is the printer 2, the auxiliary program 42 reads out the characteristic data of the printer 2 from the memory 12 (arrow J).

Also, the auxiliary program 42 performs rasterization based on the received intermediate image data, and generates print data (arrow K). The processing of the arrow K is an example of the generation processing. In the processing of the arrow K, the auxiliary program 42 rasterizes the intermediate image data to generate print data. The print data that is generated in the processing of the arrow K is data having a format that can be used for printing in the printer 2, and is, for example, PDL data dedicated to the model of the printer 2. The rasterization in the auxiliary program 42 that corresponds to the printer 2 increases a possibility that print data having a higher degree of freedom and more suitable for printing in the printer 2 will be generated, as compared to rasterization in the general-purpose print program 41. Note that, the print data that is generated in the processing of the arrow K may also be data having a format that can also be used for printing in a printer other than the model of the printer 2.

Then, the auxiliary program 42 corrects the print data generated in the processing of the arrow K (arrow L) by using the characteristic data read in the processing of the arrow J, thereby generating corrected print data. The processing of the arrow L is an example of the correction processing. The auxiliary program 42 corrects the print data by using the characteristic data of the printer 2, so that the corrected print data capable of canceling unevenness due to the characteristic specific to the printer 2 is generated.

Note that, the auxiliary program 42 may execute the processing of the arrow K and the processing of the arrow L at the same time. That is, when rasterizing the intermediate image data, the auxiliary program 42 may generate the corrected print data that is the print data corrected by adding the correction based on the characteristic data. In this case, the processing of executing the processing of the arrow K and the processing of the arrow L at the same time is an example of the corrected print data generation processing.

Also, instead of the auxiliary program 42 generating the print data in the processing of the arrow K, the general-purpose print program 41 may generate the print data. That is, the general-purpose print program 41 rasterizes the intermediate image data generated in the processing of the arrow H to generate print data, and transfers the generated print data to the auxiliary program 42. The auxiliary program 42 can generate corrected print data by correcting the print data received from the general-purpose print program 41, based on the characteristic data read in the processing of the arrow J.

The rasterization processing by the general-purpose print program 41 is different from the rasterization processing by the auxiliary program. The print data generated by the general-purpose print program 41 is print data having a format that can be used for printing in a variety of printers, and is, for example, PWG Raster data or PDF data. The rasterization by the general-purpose print program 41 reduces the processing of the auxiliary program 42 and suppresses the design process of the auxiliary program 42. Note that, in a case where the general-purpose print program 41 can generate the print data from the image data included in the print instruction without via the intermediate image data, the processing of generating the intermediate image data in the processing of the arrow H may be omitted.

Also, the auxiliary program 42 may correct the intermediate image data. The auxiliary program 42 may correct the intermediate image data received from the general-purpose print program 41 in the processing of the arrow I based on the characteristic data read in the processing of the arrow J, and generate the print data based on the intermediate image data after the correction. Even in this way, the corrected print data corrected based on the characteristic data is generated. Also, the intermediate image data after the correction may be transferred to the general-purpose print program 41 and may be rasterized by the general-purpose print program 41.

Then, the auxiliary program 42 transmits the generated corrected print data to the printer 2 together with a print execution command (arrow M). The processing of the arrow M is an example of the output processing. Note that, the transmission to the printer 2 may also be performed by the general-purpose print program 41. That is, the auxiliary program 42 may transfer the corrected print data generated in the processing of the arrow L to the general-purpose print program 41 such that the corrected print data is transmitted from the PC 1 to the printer 2 as a transmission destination. The general-purpose print program 41 transmits the corrected print data received from the auxiliary program 42 to the printer 2. In this case, the processing of the auxiliary program 42 transferring the corrected print data to the general-purpose print program 41 is an example of the output processing.

The printer that receives the corrected print data and the print execution command executes printing of an image of the corrected print data based on the received print execution command Since the corrected print data is the print data corrected based on the characteristic data of the printer 2, it is not necessary to perform the correction in the printer 2 or the necessity is reduced, and the deviation due to the characteristic specific to the printer 2 is cancelled in a printed material generated by the printer 2.

As described in detail above, the auxiliary program 42 of the present aspect acquires in advance the printer-specific characteristic data from the printer 2, and when the print instruction is sent to the general-purpose print program 41, the auxiliary program 42 generates the corrected print data by using the characteristic data, and outputs the corrected print data to the printer 2. Thereby, an image suitable for each printer is printed. As a result, it is possible to suppress unevenness in print quality due to the printer-specific characteristic.

Figure 4:
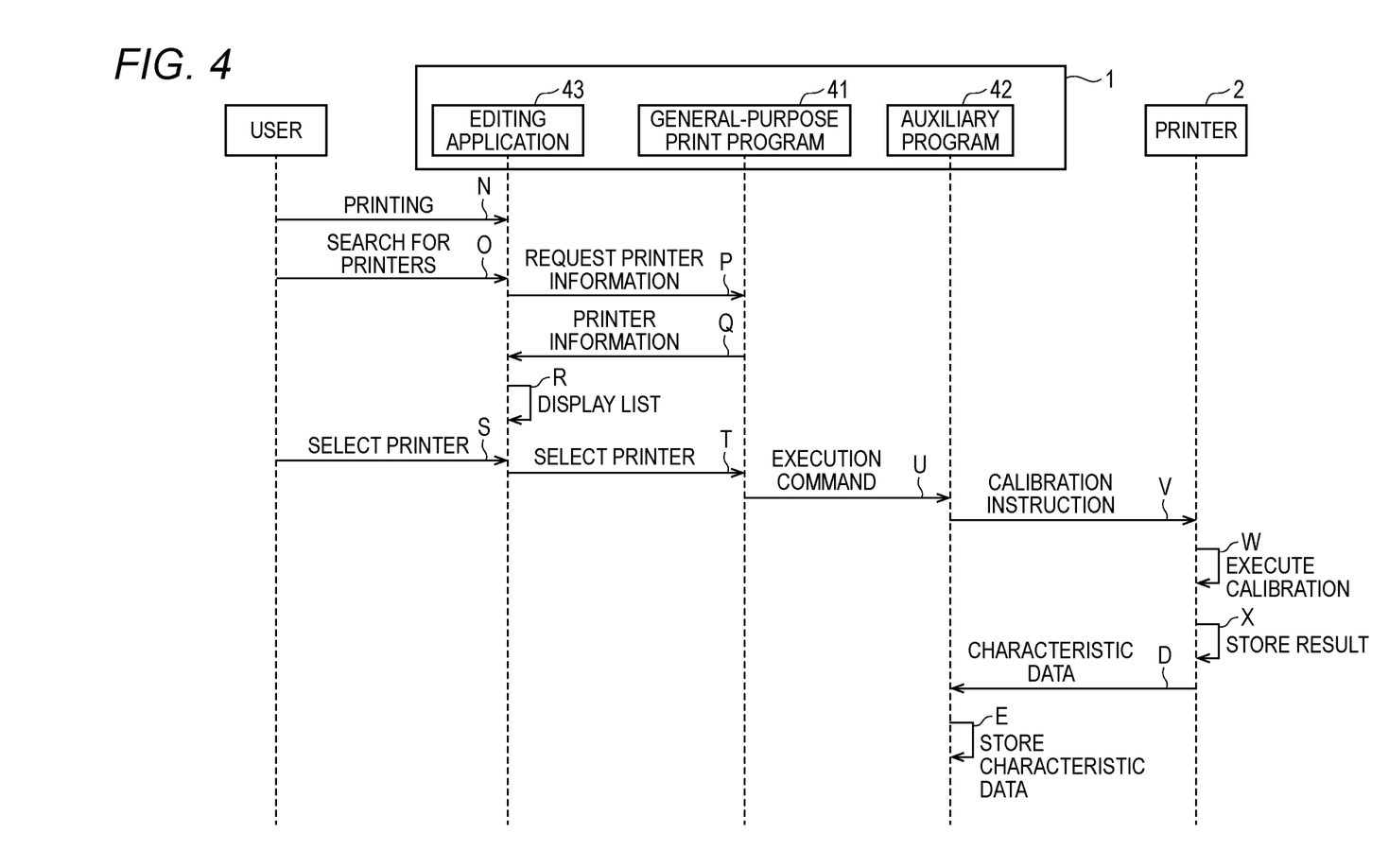
FIG. 4 is a sequence diagram for illustrating an example of a sequence of a characteristic data acquisition operation by each program in a second aspect.

Subsequently, a characteristic data acquisition procedure including operations of the auxiliary program 42 of a second aspect is described with reference to a sequence diagram of FIG. 4. The second aspect is different from the first aspect, with respect to the timing at which the acquisition of the characteristic data is executed. In descriptions below and FIG. 4, the same processing as the first aspect is denoted with the same reference signs, and the descriptions thereof are omitted.

In the second aspect, the editing application 43 receives a user's instruction to open a printing-related menu (arrow N). The editing application 43 receives, for example, selection of a printer, selection of a print setting, selection of image data of a print target and an instruction of print execution from the printing-related menu. When the editing application 43 receives an instruction to search for printers for selection of a printer by a user operation (arrow O), the editing application 43 requests information of a selectable printer list from the general-purpose print program 41 (arrow P). The editing application 43 acquires the information of the printer list from the general-purpose print program 41 (arrow Q), and displays the printer list on the UI 20 (arrow R).

The editing application 43 receives selection of a printer by a user operation in the displayed list (arrow S). The editing application 43 can also receive an instruction of calibration execution in addition to the instruction of printer selection. Note that, in the second aspect, a case where the printer 2 is selected is described. The editing application 43 transfers information, which indicates that the printer 2 is selected, to the general-purpose print program 41 (arrow T).

When the selected apparatus is the printer 2, since the auxiliary program 42 that corresponds to the printer 2 is stored in the memory 12, the general-purpose print program 41 outputs an execution command for processing of the auxiliary program 42, and causes the auxiliary program 42 to operate (arrow U). The execution command transferred from the general-purpose print program 41 includes the information indicative of the selected printer.

The auxiliary program 42 performs communication with the printer 2 that is the selected printer based on the execution command from the general-purpose print program 41, and transmits a command to instruct execution of calibration processing to the printer 2 (arrow V). When the auxiliary program 42 of the second aspect receives the information, which indicates that the printer 2 is selected, from the general-purpose print program 41, the auxiliary program 42 causes the printer 2 to execute calibration processing.

When the printer 2 receives the command to instruct execution of calibration processing, the printer 2 executes calibration processing (arrow W), acquires the characteristic data as a result of the calibration processing, and stores the acquired characteristic data in the memory of the printer 2 (arrow X). Also, the printer 2 transmits the acquired characteristic data to the PC 1 that instructs the execution of calibration processing (arrow D). Thereby, the auxiliary program 42 acquires the characteristic data. The processing of the arrow D shown in FIG. 4 is an example of the acquisition processing.

Also, similar to the example of FIG. 2, the auxiliary program 42 stores the acquired characteristic data in the memory 12 (arrow E). The processing of the arrow E is an example of the storing processing. Thereafter, when the application that receives a print instruction, such as the editing application 43, receives a print execution instruction for causing the printer 2 to perform printing by using the general-purpose print program 41, the auxiliary program 42 corrects the print data by using the stored characteristic data, as shown in FIG. 3.

As described in detail above, according to the auxiliary program 42 of the second aspect, it is possible to perform printing of an image suitable for each printer by using the printer-specific characteristic data, similar to the first aspect. Particularly, in the second aspect, when the printer 2 is selected, the printer 2 is instructed to execute the calibration processing. Therefore, when a possibility that printing will be executed in the printer 2 increases, it is possible to acquire the latest characteristic data at that time. The second aspect is particularly favorable when the characteristic data is data that changes depending on the environment change or over time.

Note that, in the second aspect, when the printer 2 is selected, the printer 2 is caused to execute the calibration processing. However, the execution timing of the calibration processing is not limited thereto. For example, the calibration processing may be executed when the printer caused to perform printing is changed from another printer, or may be executed when a user's instruction for the calibration execution is received. Also, instead of the printer being caused to execute the calibration processing when the printer is selected, the characteristic data stored in the printer 2 may be received from the printer 2.

Figure 5:
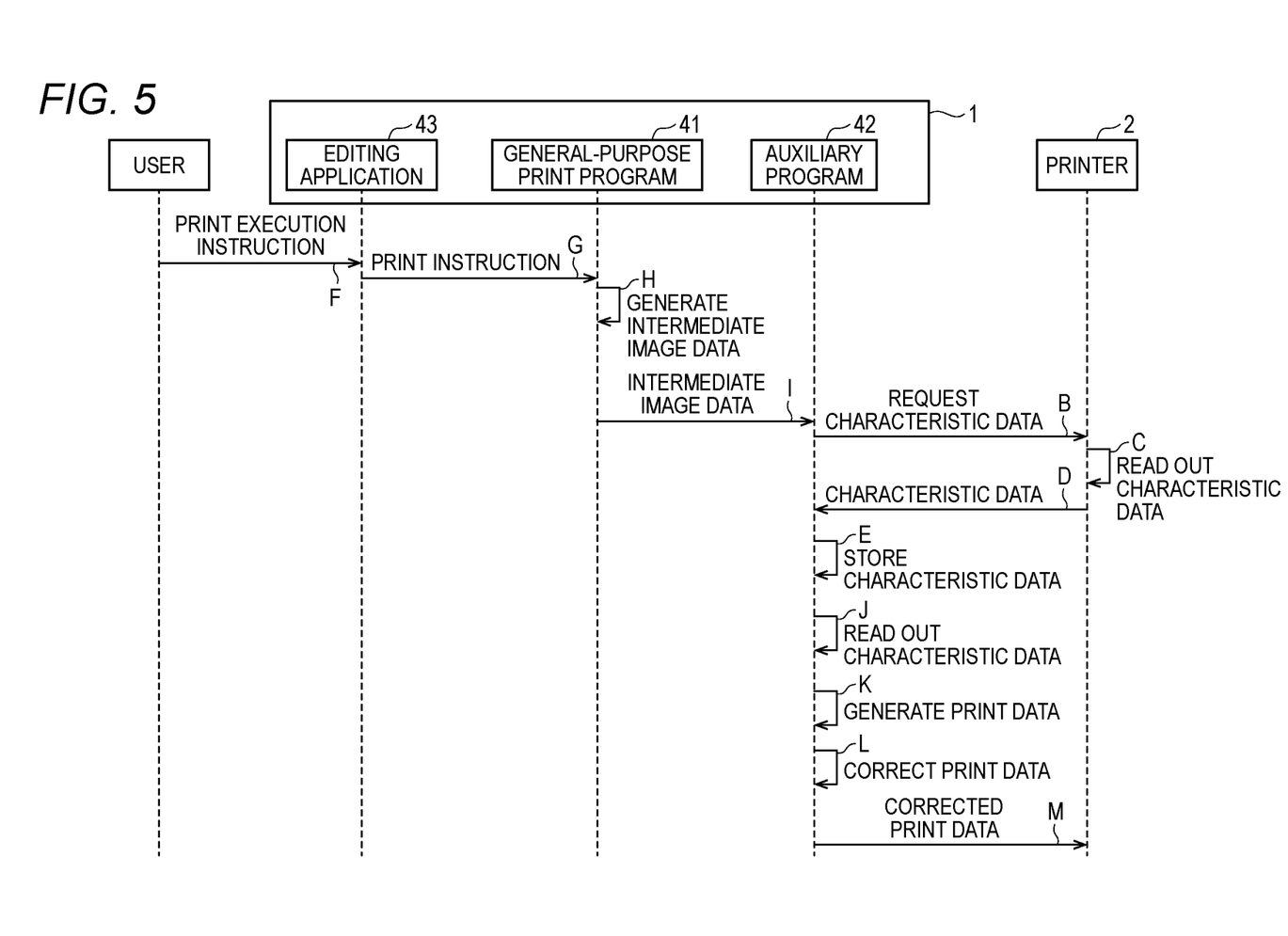
FIG. 5 is a sequence diagram for illustrating an example of a sequence of a characteristic data acquisition operation and a printing operation by each program in a third aspect.

Subsequently, a procedure of characteristic data acquisition and print execution including operations of the auxiliary program 42 of a third aspect is described with reference to a sequence diagram of FIG. 5. The third aspect is different from the first and second aspects, with respect to the timing at which the characteristic data is acquired from the printer 2. In descriptions below and FIG. 5, the same processing as the first and second aspects is denoted with the same reference signs, and the descriptions thereof are omitted.

Figure 3:
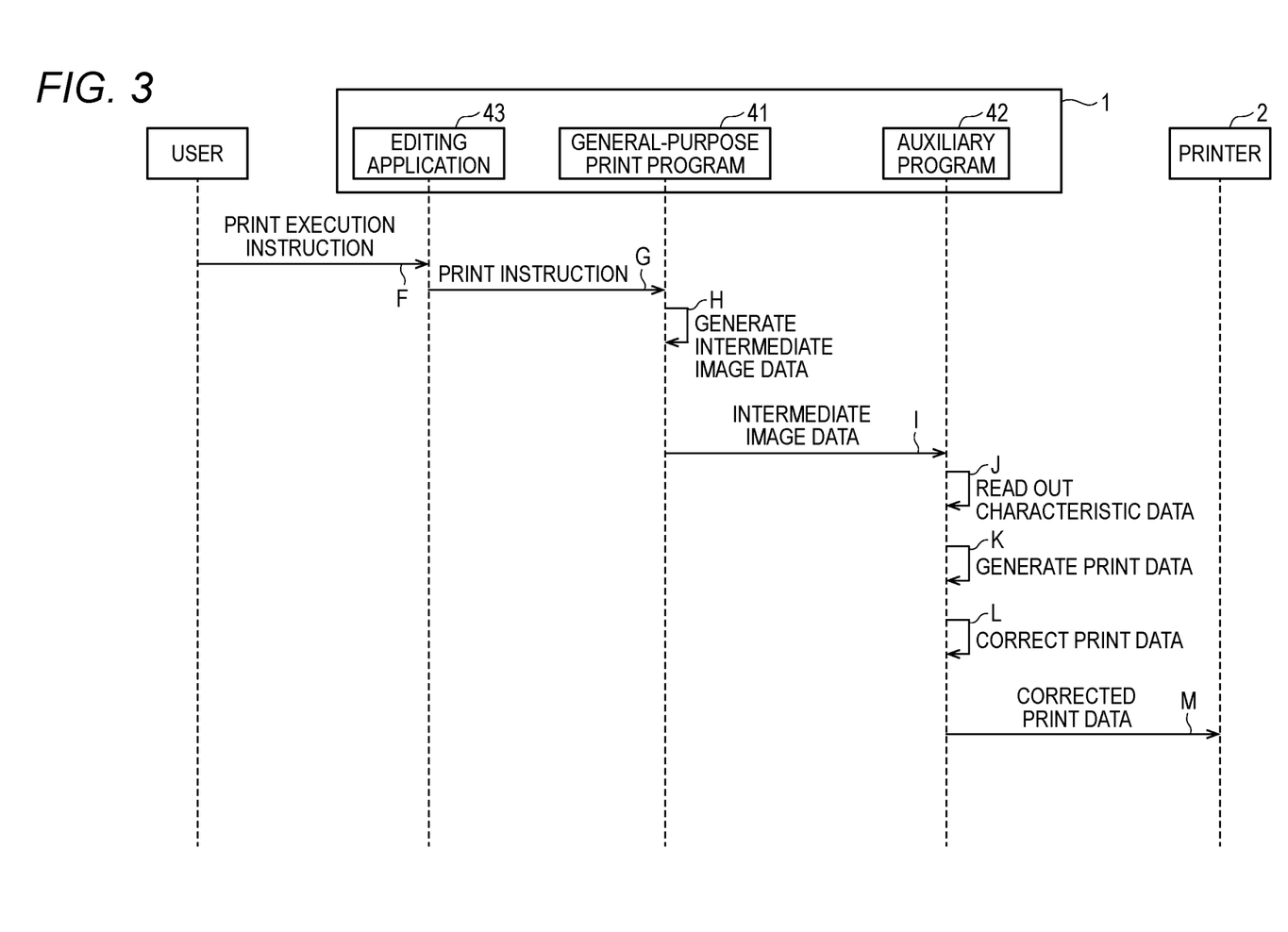
FIG. 3 is a sequence diagram for illustrating an example of a sequence of a printing operation by each program.

In the third aspect, the processing similar to the processing of the arrow F to the arrow I shown in FIG. 3 is first executed. That is, the editing application 43 receives a user's print execution instruction input, and the general-purpose print program 41 generates the intermediate image data. The general-purpose print program 41 outputs the execution command of the auxiliary program 42, and transfers the generated intermediate image data to the auxiliary program 42.

The auxiliary program 42 receives the execution command in the processing of the arrow I and acquires the characteristic data, similar to the processing of the arrow B to the arrow E shown in FIG. 2. That is, the auxiliary program 42 performs communication with the printer 2 via the communication IF 30, and requests the characteristic data stored in the printer 2 (arrow B). The printer 2 reads out the characteristic data stored in the memory of the printer (arrow C), and sends a reply to the auxiliary program 42 (arrow D). The auxiliary program 42 acquires the characteristic data transmitted from the printer 2 in the processing of the arrow D, and stores the acquired characteristic data in the memory 12 (arrow E). Also in the third aspect, the processing of the arrow D is an example of the acquisition processing, and the processing of the arrow E is an example of the storing processing.

Then, the auxiliary program 42 executes processing similar to the processing of the arrow J to the arrow M shown in FIG. 3. That is, the auxiliary program 42 generates corrected print data based on the received intermediate image data, and transmits the generated corrected print data to the printer 2. Also in the present aspect, the processing of the arrow K and the arrow L is an example of the corrected print data generation processing, and the processing of the arrow M is an example of the output processing. Note that, the correction may be performed for the intermediate image data, or may be performed for print data after generating the print data. Note that, also in the third aspect, the printer 2 may be caused to execute the calibration processing.

According to the third aspect, after receiving the execution instruction based on the print instruction from the general-purpose print program 41, the auxiliary program 42 acquires the characteristic data from the printer 2 before generating the corrected print data. In the third aspect, since it is possible to acquire the latest characteristic data, the third aspect is particularly favorable when the characteristic data is a value that changes depending on the environment or over time. Note that, also in the third aspect, the print data may be generated by the general-purpose print program 41. In the third aspect, the timing at which the auxiliary program 42 acquires the characteristic data is not limited to the timing after receiving the intermediate image data or the print data, and may be timing after the auxiliary program 42 is executed according to the print instruction using the general-purpose print program 41.

In the meantime, if the characteristic data is acquired every time the print instruction is received, a time period after the print instruction is input until a printed material of a first page is output may be lengthened. Therefore, the condition for acquiring the characteristic data may be further added. For example, the characteristic data may be acquired when a print instruction is received after a predetermined time elapses since previous acquisition. Alternatively, the characteristic data may be acquired when a first print instruction of a day is received. Alternatively, in a configuration where an option as to whether to update the characteristic data is added to a print instruction, the characteristic data may be acquired when a print instruction to which the option is added is received. Alternatively, the acquisition of characteristic data may be executed when characteristic data corresponding to a printer of a print instruction target is not stored in the memory 12.

As described in detail above, according to the auxiliary program 42 of the third aspect, it is possible to perform printing of an image suitable for each printer by using the printer-specific characteristic data, similar to the first and second aspects. Particularly, in the third aspect, since the characteristic data is acquired after receiving the print instruction, a possibility that the latest data will be acquired is high.

Note that, the embodiments disclosed herein are just exemplary and are not intended to limit the present invention. Therefore, the technology disclosed herein can be diversely improved and modified without departing from the spirit thereof. For example, the apparatus that is connected to the PC 1 is not limited to the printer, and any apparatus having a printing function such as a complex machine, a copier and a FAX apparatus is also possible. Also, the number of the printer connected to the PC 1 is not limited to the shown example, and two or more printers may be connected to the PC 1.

Also, in the above embodiments, only the printing operation using the characteristic data has been described in detail as the operation of the auxiliary program 42. However, the auxiliary program 42 may also have further functions. The module configured to execute the operation of acquiring the characteristic data is not limited to the auxiliary program 42, and may also be a program configured to receive an instruction from the OS 21 or the general-purpose print program 41 when performing printing by using the general-purpose print program. For example, a print workflow application (Print workflow) released by Microsoft may be possible.

Also, the execution timing of the auxiliary program 42 is not limited to the embodiments. For example, the auxiliary program 42 may be directly executed by an instruction from the OS 21 or the resident auxiliary program 42 is also possible. The resident auxiliary program 42 may perform the above operations by receiving the execution command.

Note that, the plurality of processing in the plurality of steps in the flowcharts described in the embodiments can be executed by changing the execution order arbitrarily or can be executed in parallel within a scope that does not cause any contradiction in the processing content.

Note that, the processing described in the embodiments can be executed by hardware such as a single CPU, a plurality of CPUs, an ASIC and the like or a combination thereof. Also, the processing described in the embodiments can be implemented in diverse aspects such as a recording medium on which a program for executing the processing is recorded, a method and the like.

What is claimed is:

1. A non-transitory computer readable storage medium that stores a support application program executable by a computer included an information processing device in which a general-purpose print program is installed in advance in an operating system and that is available for printing using a printer connected to the information processing device, the support application program causing the computer to execute:

acquisition processing of acquiring characteristic data with respect to print quality indicative of a printer-specific characteristic from the printer, the characteristic data being a printer-specific value and being not available for a print data generation processing by the general-purpose print program; and storing processing of storing the characteristic data acquired in the acquisition processing in the storage medium included in the information processing device, wherein, in a case where a print instruction that causes the printer to execute printing of an image is sent to the general-purpose print program installed in advance in the operating system of the information processing device, the support application program causes the computer to further execute:

corrected print data generation processing of generating corrected print data by correcting the image that is a print target of the print instruction based on the characteristic data acquired in the acquisition processing and stored in the storage medium in the storing processing; and output processing of outputting the corrected print data generated in the corrected print data generation processing such that the corrected print data is transmitted from the information processing device to the printer as a transmission destination.

2. The non-transitory computer readable storage medium according to claim 1,
wherein, in the corrected print data generation processing, the support application program causes the computer to execute:
acquiring intermediate image data indicative of the image that is the print target of the print instruction from the general-purpose print program, and generation processing of generating print data based on the intermediate image data; and
correction processing of correcting the print data generated in the generation processing based on the characteristic data, and
wherein the print data corrected in the correction processing is set as the corrected print data.

3. The non-transitory computer readable storage medium according to claim 1,
wherein, in the corrected print data generation processing, the support application program causes the computer to generate the corrected print data by acquiring print data generated by the general-purpose print program from the general-purpose print program, and by correcting the acquired print data based on the characteristic data.

4. The non-transitory computer readable storage medium according to claim 1,
wherein, in the acquisition processing, the support application program causes the computer to acquire the characteristic data by transmitting, to the printer, a command to cause the printer to execute calibration processing of acquiring the characteristic data, and by receiving the characteristic data, which is a result of the calibration processing, transmitted from the printer.

5. The non-transitory computer readable storage medium according to claim 1,
wherein, when information of the printer is installed in the information processing device, the support application program causes the computer to execute the acquisition processing by being invoked from the operating system.

6. The non-transitory computer readable storage medium according to claim 1,
wherein, when the printer is selected from an application program installed in the operating system or the information processing device, the support application program causes the computer to execute the acquisition processing by being invoked from the operating system.

7. The non-transitory computer readable storage medium according to claim 1,
wherein, when the print instruction is sent, the support application program causes the computer to execute the acquisition processing by being invoked from the operating system before executing the corrected print data generation processing.

8. An information processing device comprising a computer,
wherein an operating system of the information processing device has a general-purpose print program installed in advance in the operating system,
wherein a support application program available for printing using a printer connected to the information processing device is installed in the information processing device,
wherein the computer executes:
acquisition processing of acquiring characteristic data with respect to print quality indicative of a printer-specific characteristic from the printer; and
storing processing of storing the characteristic data acquired in the acquisition processing in a memory included the information processing device, the characteristic data being a printer-specific value and being not available for a print data generation processing by the general-purpose print program, and
wherein, in a case where a print instruction that causes the printer to execute printing of an image is sent to the general-purpose print program, the computer further executes:
corrected print data generation processing of generating corrected print data by correcting the image that is a print target of the print instruction based on the characteristic data acquired in the acquisition processing and stored in the memory in the storing processing; and
output processing of outputting the corrected print data generated in the corrected print data generation processing such that the corrected print data is transmitted from the information processing device to the printer as a transmission destination.

9. A printing method of causing a printer to execute printing based on print data generated in an information process device,
the printer being connected to the information processing device,
an operating system of the information processing device having a general-purpose print program installed in advance in the operation system,
a support application program available for printing using the printer connected to the information processing device being installed in the information processing device,
the printing method comprising:
acquiring characteristic data with respect to print quality indicative of a printer-specific characteristic from the printer, the characteristic data being a printer-specific value and being not available for a print data generation processing by the general-purpose print program; and
storing the acquired characteristic data in a memory included in the information processing device, and
wherein, in a case where a print instruction that causes the printer to execute printing of an image is sent to the general-purpose print program, the printing method further comprises:
generating corrected print data by correcting print data based on the characteristic data acquired in the acquiring and stored in the memory in the storing, the print data being rasterized based on the image that is a print target of the print instruction; and
outputting the corrected print data such that the corrected print data is transmitted from the information processing device to the printer as a transmission destination.

10. The non-transitory computer readable storage medium according to claim 1, wherein the characteristic data being values that change due to environmental change or aging deterioration after shipment.

11. The non-transitory computer readable storage medium according to claim 1, wherein the characteristic data being head characteristic values.

12. The information processing device according to claim 8, wherein the characteristic data being values that change due to environmental change or aging deterioration after shipment.

13. The information processing device according to claim 8, wherein the characteristic data being head characteristic values.

14. The method according to claim 9, wherein the characteristic data being values that change due to environmental change or aging deterioration after shipment.

15. The method according to claim 9, wherein the characteristic data being head characteristic values.

\* \* \* \* \*

UNITED STATES PATENT AND TRADEMARK OFFICE
CERTIFICATE OF CORRECTION

PATENT NO. : 11,775,230 B2
APPLICATION NO. : 17/215094
DATED : October 3, 2023
INVENTOR(S) : Yoshito Hosomizo It is certified that error appears in the above-identified patent and that said Letters Patent is hereby corrected as shown below:

In the Claims

Column 12, Claim 1, Line 39 should read:
computer included in an information processing device in Column 14, Claim 8, Line 7 should read:
included in the information processing device, the char- Column 14, Claim 10, Line 58 should read:
according to claim 1, wherein the characteristic data are Column 14, Claim 11, Line 62 should read:
according to claim 1, wherein the characteristic data are Column 14, Claim 12, Line 65 should read:
8, wherein the characteristic data are values that change Column 15, Claim 13, Line 2 should read:
8, wherein the characteristic data are head characteristic Column 15, Claim 14, Line 5 should read:
acteristic data are values that change due to environmental Column 15, Claim 15, Line 8 should read:
acteristic data are head characteristic values.

Signed and Sealed this
Sixteenth Day of July, 2024

Katherine Kelly Vidal
*Director of the United States Patent and Trademark Office*